United States Patent Office 3,022,349
Patented Feb. 20, 1962

3,022,349
PRODUCTION OF AMINES
Russell C. Lemon, Scott Depot, and Richard C. Myerly, Dunbar, W. Va., assignors to Union Carbide Corporation, a corporation of New York
No Drawing. Filed Dec. 30, 1957, Ser. No. 705,768
4 Claims. (Cl. 260—585)

This invention relates to a process for producing aliphatic amines. In a particular aspect, this invention relates to the production of aliphatic amines by the vapor phase alkylation of ammonia with alcohols.

The formation of amines from ammonia and alcohols has been studied since the early work of Sabatier and Mailhe, which was reported in Comptes Rendus, 148, 898 (1909). Dehydration catalysts and metallic hydrogenation catalysts have been found to give the most satisfactory results.

In United States Patent No. 2,053,193 to Guinot, a process is disclosed which consists essentially of the partial condensation of ammonia with an alcohol and conversion into a nitrile in a first stage, and then the partial hydrogenation of the nitrile thus formed in a second stage. An elaborate system of product separation and recycling is involved, and a primary lower alkyl monoamine is continuously separated as the end product. This process is too complicated for practical industrial application and it is essentially limited to the production of lower alkyl primary amines.

In United States Patent No. 2,365,721, Olin and McKenna disclose that amines may be produced from alcohols and ammonia at temperatures between 150° and 230° C. in the presence of metallic hydrogenation catalysts, such as nickel and cobalt, and a substantial quantity of hydrogen. Although the method of Olin and McKenna appears superior to previous methods for large-scale production of lower alkyl amines, it has limiting features which reduce its effectiveness. The product mixture recovered contains amines, nitriles, and alcohol starting material which complicate the separation of product components. Also, the reaction rates are comparatively slow for a commercial operation.

It is an object of this present invention to provide a process for producing amines from ammonia and alcohols in the presence of hydrogen.

It is another object of this invention to provide a rapid and economical vapor phase method of producing aliphatic amines which is superior to any method known heretofore for large-scale commercial operation and which involves the use of a relatively simple arrangement of equipment and a minimum number of reaction and separation zones.

It is a further object of this invention to provide saturated aliphatic amine products, essentially free of nitriles and alcohols, by the alkylation of ammonia with alcohols in the presence of hydrogen and metallic hydrogenation catalysts.

Various other objects and advantages of this invention will become apparent to those skilled in the art from the accompanying description and disclosure.

Accordingly, the above objects are accomplished by reacting together ammonia and an alcohol selected from saturated aliphatic primary alcohols having between about two and ten carbon atoms which comprises passing a vapor phase mixture of ammonia, hydrogen and said alcohol over a hydrogenation catalyst in a first reaction zone maintained at a temperature between about 180° C. and 300° C. for a residence time permitting conversion of substantially all of the alcohol in the said mixture, and allowing the product effluent from said first reaction zone to pass over a hydrogenation catalyst in a second reaction zone maintained at a temperature between about 150° C. and 250° C. for a residence time permitting complete conversion of any alcohol present in the product effluent stream from said first reaction zone.

The alcohols most preferred in this invention for condensation with ammonia are those selected from saturated aliphatic and alicyclic primary alcohols having between about two and ten carbon atoms. The term "aliphatic" as used hereinafter is meant to include both acyclic and cyclic compounds. Illustrative of suitable alcohols are ethanol, 1-propanol, 1-butanol, 2-methyl-1-propanol, 1-pentanol, 2-methyl-1-butanol, 3-methyl-1-butanol, 1-hexanol, 2-methyl-1-pentanol, 3-methyl-1-pentanol, 4-methyl-1 - pentanol, 2-ethyl-1-butanol, 1 - heptanol, 2 - methyl-1-hexanol, 3-methyl-1-hexanol, 4-methyl-1-hexanol, 5-methyl-1-hexanol, 2-ethyl-1-pentanol, 3-ethyl-1-pentanol, 2,2-dimethyl-1-pentanol, 3,3-dimethyl-1-pentanol, 2,3-dimethyl-1-pentanol, 2,4-dimethyl-1 - pentanol, 3,4 - dimethyl-1-pentanol, 1-octanol; the respective propyl-, ethylmethyl- and trimethyl-substituted 1-pentanols; ethyl- and dimethyl-substituted 1-hexanols; methyl-substituted 1-octanols; 1-nonanol, 1-decanol and cyclohexyl carbinol and the like. The process is also adaptable to mixtures of alcohols such as the ten-carbon primary alcohols obtained in the Oxo process.

The alcohol is thoroughly mixed with ammonia and hydrogen in the vapor phase and heated to approximately the reaction temperature before being passed over the hydrogenation catalyst in the first reaction zone. The effluent stream from the first reaction zone contains a mixture of mono-, di- and trialkyl amines as well as a small amount of alcohol and water, and a substantial quantity of nitrile product, hydrogen and ammonia. This product stream effluent is allowed to enter a second reaction zone which contains a hydrogenation catalyst. In this second stage, all of the nitrile product is converted into a mixture of mono-, di- and trialkyl amines, with the conversion being predominantly to the dialkyl amine. The small amount of alcohol that enters into the second reaction zone is completely consumed. The resulting effluent product stream from this second reaction zone contains only amines and water.

The proportions of amines produced are directly dependent on the reaction conditions and the particular ratio of reactants involved.

Ammonia should be present in an amount at least equal to the molar equivalent of alcohol, and it is preferred that the ratio of ammonia to alcohol be in the range of between two and five moles of ammonia for every mole of alcohol in the reaction mixture. As the ratio of ammonia to alcohol increases, it is observed that the proportion of monoamine in the product increases.

The quantity of hydrogen which may be employed can vary between one mole and ten moles for every mole of alcohol present in the reaction mixture. Better results are attainable when a greater than molecular equivalent of hydrogen is used as compared to the quantity of alcohol. In a preferred embodiment of this invention, hydrogen is employed in a ratio of between two moles and six moles for every mole of alcohol being reacted. A large excess of hydrogen in the reaction mixture reduces the amount of nitrile product present in the effluent stream from the first reaction zone, and, in some cases, it may be observed that the proportions of di-substituted amine and tri-substituted amine in the final product mixture are diminished to a limited extent.

The hydrogenation catalysts or mixtures thereof contained in the two reaction zones may be supported on a suitable carrier such as alumina, silica, kieselguhr and the like. The metallic hydrogenation catalysts may be distributed on the carrier material in the form of their oxides and then reduced with a stream of hydrogen.

The catalyst employed in the first reaction zone may be selected from the group of metals comprising cobalt, nickel and copper. The catalyst used in the second reaction zone may be selected from the group comprising cobalt and nickel. Although the process is not limited to a particular kind of catalyst in each reaction zone, it has been found that yields and conversions are excellent when copper is employed in the first reaction zone and nickel is employed in the second reaction zone.

Control of the reaction temperatures in the two reaction zones is relatively important for optimum results. The reaction temperature in the first reaction zone should be maintained in the range between about 180° C. and 300° C., with the preferred range being between about 240° C. and 280° C. The reaction temperature in the second reaction zone should be maintained in the range between about 150° C. and 250° C., with the preferred range being between about 180° C. and 220° C.

The reaction temperatures in the reaction zones affect the rate of reaction and the kind of products obtained. Increasing the reaction temperature has several effects. For example, the rate of reaction increases markedly and the amount of nitrile formed in the first reaction zone is increased.

Another process variable which must be controlled is the velocity of the vapors through the reaction zones, i.e., the residence time of the reactants over the catalysts. This rate factor will be completely dependent on the particular alcohol being converted to amines and on the catalysts and, most significantly, on the reaction temperature. Generally, it may be stated that the maximum space velocity should be used, i.e., the shortest residence time over the catalysts, which will allow most of the alcohol to be converted in the first reaction zone and which will cause substantially all of the nitrile product and all of the residual alcohol from the first reaction zone to be converted to amines in the second reaction zone. As an illustration of practical flow rates relative to the process of this invention, a suitable space velocity would be in the range from about 430 l./l./hr. to 130 l./l./hr. In terms of residence time, the vapor stream would contact each catalyst for a period of time between about 5 and 15 seconds.

This invention may be practiced at pressures varying from atmospheric pressure to pressures in excess of several hundred pounds per square inch. Atmospheric pressure and pressures close to atmospheric pressure should suffice for the proper conduct of most embodiments of the process of this invention. The rate of reaction decreases as the pressure is increased, and the reaction course is somewhat modified, e.g., the quantity of nitrile product ensuing from the first reaction zone is diminished.

This invention is especially adaptable to large-scale commercial operation because of the relatively mild conditions involved and the minimum of simple equipment required. In the simplest embodiment of the invention, the vapor phase streams of alcohol, ammonia and hydrogen are thoroughly mixed in the desired proportions and passed through a heating unit which heats the homogeneous vapor stream to approximately the temperature maintained in the first reaction zone. The heated vapor stream is passed through the first reaction zone and then immediately into the second reaction zone without any intermediate treatment or condensation of the vapor stream in between the two reaction zones. If it is desired, the vapor phase between reaction zones may be cooled or heated or otherwise manipulated, but little or no handling of the vapor stream between reaction zones is preferred in order to sustain the fullest economic value from the process.

The product stream from the second reaction zone is condensed and the volatile ammonia and hydrogen gas can be scrubbed in a suitable tower and recirculated through the system with an additional quantity of alcohol. The product condensate contains an easily separable mixture of amines and water.

Most of the alcohols which are amenable to the conversion process of this invention will yield amine product when submitted to the following typical operating conditions: the alcohol, ammonia and hydrogen are mixed in molar proportions of about 1 to 2 to 3, respectively, and passed as vapor over a reduced copper catalyst maintained at a temperature of about 260° C., and sequentially over a reduced nickel catalyst maintained at a temperature of about 180° C. The rate of vapor flow is adjusted to allow a residence time in each reaction zone of about 5 to 15 seconds.

The following examples are offered as a better understanding of the present invention. In the apparatus employed, hydrogen and ammonia are introduced through calibrated rotameters and the alcohol is introduced as a liquid by means of a proportioning pump. The measured flow of reactants enters into a preheater which is a 1 inch (I.D.) x 20 inch mild steel tube heated directly by electric resistance windings. The vaporized mixture passes into a first reactor which is a 1.25 inch (I.D.) x 49.5 inch mild steel tube surrounded by a heating jacket containing Dowtherm. The Dowtherm is heated by electric resistance windings outside of the jacket. Both the preheater and the reactor are covered by thermal insulating material applied over the resistance windings. The product flow from the first reactor passes through a second preheater-cooler and a second reactor identical in dimensions and construction with the first preheater and reactor, respectively. All the feed lines in the system are 3/16 inch (I.D.) stainless steel.

*Example 1*

This example illustrates the reaction of butanol and ammonia in the presence of hydrogen to yield a mixture of amines.

Butanol, ammonia and hydrogen in a mole ratio of 1 to 2.6 to 2.7 were fed in the vapor phase to a first reaction zone containing a bed of catalyst (640 cubic centimeters) consisting essentially of reduced copper on an alumina support. The temperature of the catalyst bed was maintained at 260° C. and the rate of feeding of the vapor stream was such that the residence time in the reaction zone was 10 seconds, based on the volume of catalyst. The product from this reaction zone had the following analysis on an ammonia- and hydrogen-free basis:

| Component: | Amount, weight percent |
|---|---|
| Butylamine | 13.3 |
| Dibutylamine | 8.1 |
| Tributylamine | 3.9 |
| Butyronitrile | 58.6 |
| Butanol | 4.5 |
| Water | 11.6 |

Without further treatment or condensation, the effluent from the first reaction zone, containing the above components in addition to ammonia and hydrogen, was passed through a second reaction zone containing a bed of catalyst (640 cubic centimeters) consisting of reduced nickel on a rigid porous mineral support composed essentially of silica. The catalyst bed in the second reaction zone was maintained at a temperature of 180° C. and the vapor flow was such that the contact time was 11.8 seconds, based on the moles of reactants fed into the first reaction zone. The product stream from the second reaction zone was collected and analyzed on an ammonia- and hydrogen-free basis:

| Component: | Amount, weight percent |
|---|---|
| Butylamine | 24.6 |
| Dibutylamine | 50.5 |
| Tributylamine | 14.4 |
| Butyronitrile | Nil |
| Butanol | Nil |
| Water | 10.5 |

The yields of products expressed as a percentage of that theoretically obtainable from the alcohol consumed are as follows:

| Product: | Yield, percent of theory, based on butanol |
|---|---|
| Butylamine | 24.9 |
| Dibutylamine | 57.9 |
| Tributylamine | 17.2 |

*Example 2*

Ethanol, ammonia and hydrogen in a mole ratio of 1 to 3.8 to 3.9 were fed in the vapor phase to a first reaction zone containing a bed of catalyst (1,000 cubic centimeters) consisting essentially of reduced copper on an alumina support. The temperature of the catalyst bed was maintained at 260° C. and the rate of feeding was such that the residence time of the vapor stream over the catalyst was ten seconds. The product effluent stream had the following analysis on an ammonia- and hydrogen-free basis:

| Component: | Amount, weight percent |
|---|---|
| Ethylamine | 8.1 |
| Diethylamine | 28.2 |
| Triethylamine | 2.9 |
| Ethanol | 3.7 |
| Water | 37.4 |
| Acetonitrile | 19.7 |

Without treatment or condensation, the product effluent stream from the first reaction zone containing the above components in addition to ammonia and hydrogen was passed through a second zone containing a catalyst (1,000 cubic centimeters) consisting of reduced nickel on a rigid, porous, mineral support composed essentially of silica. The catalyst bed was maintained at a temperature of 200° C. and the vapor flow was such that the contact time over the catalyst was 11.1 seconds. The product effluent stream from the second reaction zone had the following analysis on an ammonia- and hydrogen-free basis:

| Component: | Amount, weight percent |
|---|---|
| Ethylamine | 25.9 |
| Diethylamine | 35.3 |
| Triethylamine | 6.8 |
| Ethanol | Nil |
| Water | 32.0 |
| Acetonitrile | Nil |

The yields of amine products expressed as a percentage of that theoretically obtainable from the alcohol consumed are as follows:

| Component: | Yield, percent of theory, based on ethanol |
|---|---|
| Ethylamine | 30.9 |
| Diethylamine | 57.4 |
| Triethylamine | 11.6 |

*Example 3*

2-ethylhexanol, ammonia and hydrogen were reacted in the same manner and in the same equipment as in the foregoing examples to produce 2-ethylhexyl amines. The starting materials and the reaction conditions were as follows:

| | |
|---|---|
| Temperature in first converter | 260° C. |
| Temperature in second converter | 220° C. |
| Mole ratio, 2-ethylhexanol to $NH_3$ to $H_2$ | 1 to 2.4 to 4.8. |
| Catalyst volume, first reactor | 1000 cc. |
| Catalyst volume, second reactor | 500 cc. |
| Contact time, first reactor | 9.7 sec. |
| Contact time, second reactor | 5.2 sec. |

The product effluent stream from the first reaction zone contained the following weight percent of materials in the organic layer of the condensed product:

| Component: | Amount, weight percent |
|---|---|
| 2-ethylhexylamine | 15.2 |
| Di(2-ethylhexyl)amine | 30.5 |
| Tri(2-ethylhexyl)amine | 1.1 |
| 2-ethylhexanol | 8.1 |
| 2-ethylhexanonitrile | 44.0 |
| Water | 1.1 |

The product effluent stream from the first reaction zone was entered into a second reaction zone without any intermediate treatment or condensation. The product effluent stream from the second reaction zone contained the following weight percent of materials:

| Component: | Amount, weight percent |
|---|---|
| 2-ethylhexylamine | 23.6 |
| Di(2-ethylhexyl)amine | 67.6 |
| Tri(2-ethylhexyl)amine | 1.9 |
| 2-ethylhexanol | Nil |
| 2-ethylhexanonitrile | 5.8 |
| Water | 1.1 |

The yields of amine products expressed as a percentage of that theoretically attainable from the alcohol consumed are as follows:

| Component: | Yield, percent of theory, based on 2-ethylhexanol |
|---|---|
| 2-ethylhexylamine | 23.1 |
| Di(2-ethylhexyl)amine | 70.8 |
| Tri(2-ethylhexyl)amine | 2.0 |

What is claimed is:

1. A process for producing aliphatic amines by reacting together ammonia and an alcohol selected from saturated aliphatic hydrocarbon primary alcohols having between two and ten carbon atoms which comprises passing a vapor phase mixture of ammonia, hydrogen and said alcohol over a reduced copper catalyst in a first reaction zone maintained at a temperature between about 180° C. and 300° C. for a residence time between about 5 and 15 seconds to convert substantially all of the alcohol in the said mixture, and allowing the product effluent from said first reaction zone to pass over a reduced nickel catalyst in a second reaction zone maintained at a temperature between about 150° C. and 250° C. for a residence time between about 5 and 15 seconds to convert completely any alcohol present in the product effluent stream from said first reaction zone; and said ammonia, hydrogen and alcohol being in a ratio of between about one mole and ten moles of ammonia and between about one mole and ten moles of hydrogen for every mole of said alcohol being reacted.

2. A process for producing ethylamines by reacting together ammonia and ethanol in a sequence of reaction stages which comprises passing a vapor phase mixture of ammonia, hydrogen and ethanol over a reduced copper catalyst in a first reaction zone maintained at a temperature between about 240° C. and 280° C. for a residence time between about 5 and 15 seconds to convert substantially all of the ethanol in the said mixture, and allowing the product effluent from said first reaction zone to pass over a reduced nickel catalyst in a second reaction zone maintained at a temperature between about 180° C. and 220° C. for a residence time between about 5 and 15 seconds to convert completely any ethanol present in the product effluent stream from said first reaction zone; said ammonia, hydrogen and ethanol being in a ratio of between about two moles and five moles of ammonia and between about two moles and six moles of hydrogen for every mole of said ethanol being reacted.

3. A process for producing butylamines by reacting together ammonia and butanol in a sequence of reaction stages which comprises passing a vapor phase mixture of ammonia, hydrogen and butanol over a reduced copper catalyst in a first reaction zone maintained at a temperature between about 240° C. and 280° C. for a residence time between about 5 and 15 seconds to convert substantially all of the butanol in the said mixture, and allowing the product effluent from said first reaction zone to pass over a reduced nickel catalyst in a second reaction zone maintained at a temperature between about 180° C. and 220° C. for a residence time between about 5 and 15 seconds to convert completely any butanol present in the product effluent stream from said first reaction zone; said ammonia, hydrogen and butanol being in a ratio of between about two moles and five moles of ammonia and between about two moles and six moles of hydrogen for every mole of said butanol being reacted.

4. A process for producing 2-ethylhexyl amines by reacting together ammonia and 2-ethylhexanol in a sequence of reaction stages which comprises passing a vapor phase mixture of ammonia, hydrogen and said 2-ethylhexanol over a reduced copper catalyst in a first reaction zone maintained at a temperature between about 240° C. and 280° C. for a residence time between about 5 and 15 seconds to convert substantially all of the 2-ethylhexanol in the said mixture, and allowing the product effluent from said first reaction zone to pass over a reduced nickel catalyst in a second reaction zone maintained at a temperature between about 180° C. and 220° C. for a residence time between about 5 and 15 seconds to convert completely any 2-ethylhexanol present in the product effluent stream from said first reaction zone; said ammonia, hydrogen and 2-ethylhexanol being in a ratio of between about two moles and five moles of ammonia and between about two moles and six moles of hydrogen for every mole of said 2-ethylhexanol being reacted.

References Cited in the file of this patent
UNITED STATES PATENTS

| | | |
|---|---|---|
| 2,053,193 | Guinot | Sept. 1, 1936 |
| 2,365,721 | Olin et al. | Dec. 26, 1944 |

OTHER REFERENCES

Groggins: Unit Processes in Organic Synthesis, 4th ed., 1952, McGraw-Hill Book Co., pp. 544, 549, and 551.